Figure 1:
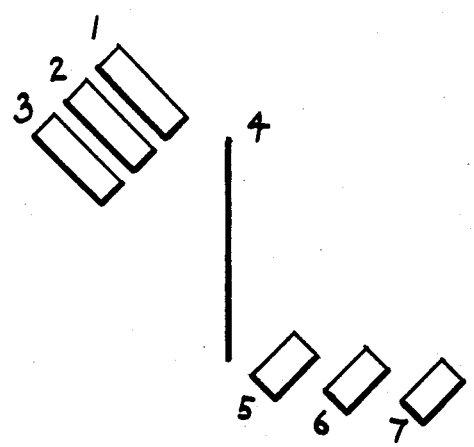
Figure 1:
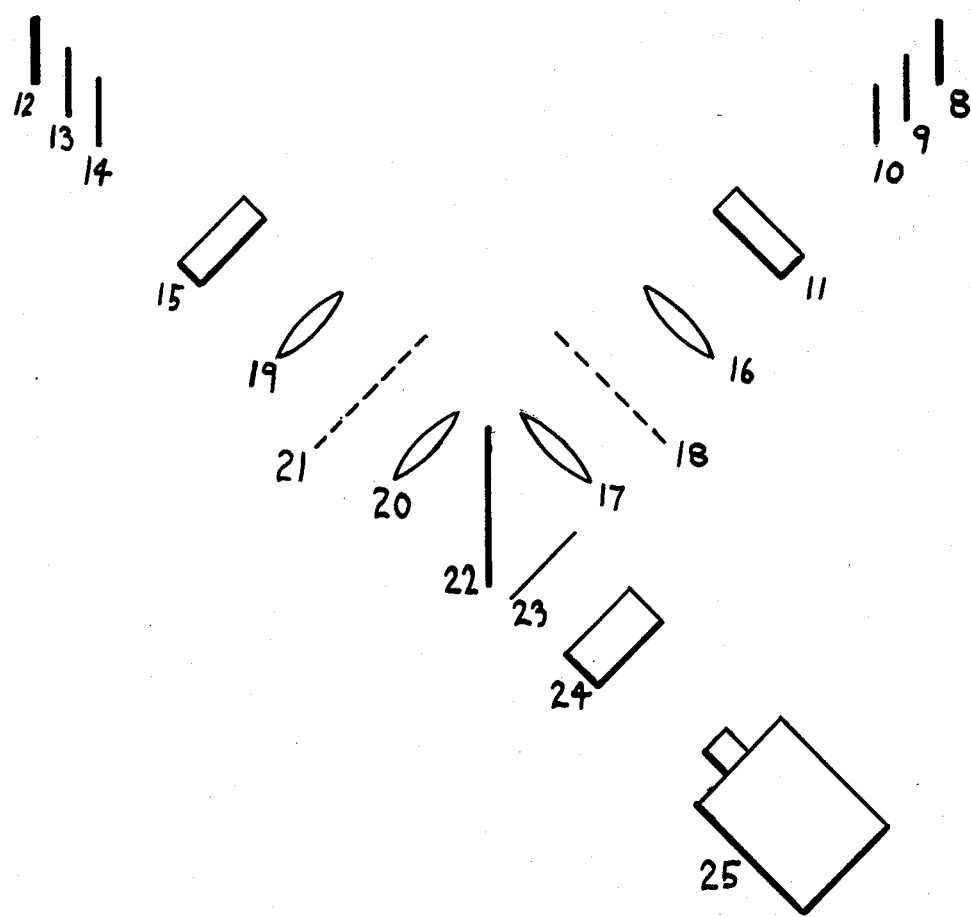

United States Patent [19]

Anthony

[11] Patent Number: 4,619,507
[45] Date of Patent: Oct. 28, 1986

[54] METHODS AND APPARATI FOR GENERATING OPTICAL MATTES

[76] Inventor: Dennis R. Anthony, 3116 Kelton Ave., Los Angeles, Calif. 90034

[21] Appl. No.: 525,416

[22] Filed: Aug. 22, 1983

[51] Int. Cl.$^3$ ............................................... G03B 19/18
[52] U.S. Cl. ....................................... 352/46; 352/47; 352/89
[58] Field of Search .............. 352/46, 47, 89; 350/30; 355/40, 77, 80, 81

[56] References Cited

U.S. PATENT DOCUMENTS

| | | | |
|---|---|---|---|
| 2,866,397 | 12/1958 | Gillette | 355/40 |
| 3,155,978 | 11/1964 | Seitz | 352/47 |
| 3,521,954 | 7/1970 | French | 355/80 |
| 3,680,956 | 8/1972 | Custer | 355/80 |
| 4,417,791 | 11/1983 | Erland et al. | 352/89 |

Primary Examiner—Monroe H. Hayes

[57] ABSTRACT

The invention pertains to the art of photography and provides a method of making the optical mattes that are used in making composite photographs. The method consists of transforming an image of an object photographed against an illuminated background into a luminous silhouette of the object on a dark background, diminishing the luminosity contrast within the said silhouette, and recording the result on black-and-white film. The invention includes apparatus necessary to carry out the method.

2 Claims, 1 Drawing Figure

METHODS AND APPARATI FOR GENERATING OPTICAL MATTES

The invention pertains to the art of photography and provides a method of making the optical mattes that are used in making composite photographs. The method consists of causing light making up an image of an object and a background and light making up an image of the background alone to interfere destructively thus to create an image of a luminous silhouette of the object on a black background, which image can be exposed onto back-and-white film to create the desired matte.

BRIEF DESCRIPTION OF THE PRIOR ART

An optical matte is simply an opaque silhouette of an object on otherwise clear film. Both positive mattes and negative mattes are used in the making of composite photographs, particularly in the making of science-fiction and fantasy motion pictures. In the prior art mattes are made either directly, by photographing the object silhouetted against a bright background, or indirectly, by applying laboratory techniques to film bearing an image of the object photographed against a special background. The present invention pertains only to the indirect method of generating mattes.

The indirect method may be used in one of two ways, the density-matte process or the color-separation process. For both processes the object of which a matte is to be made must be photographed against a featureless, luminous screen.

A density matte is only feasible when the object can be photographed against a white screen brighter than its brightest spot without overexposing the image of the screen or underexposing the image of the object's dimmest spot. The density matte is made by reprinting the image of the object and the screen onto black-and-white film, reprinting the resulting gray silhouette of the object onto another strip of black-and-white film, and continuing the reprinting process until the silhouette of the object develops to the desired opacity. The reprinting of the silhouette through several generations of black-and-white film is necessary because a matte of proper opacity cannot usually be made in a single reprinting of the object's image onto black-and-white film without either underdeveloping the dimmer areas of the object's image and thereby leaving semitransparent holes in the silhouette or overexposing the image of the screen and thereby causing the screen's image to bleed onto the silhouette.

A color-separation matte becomes necessary when lighting conditions on the object don't permit the making of a density matte. The object will be photographed against a screen that displays only one of the primary colors—red, green, or blue—of photography and then the positive print of the color film will be reprinted onto three strips of black-and-white film, each strip being exposed to the color print through a filter of one of the primary colors or with light of one of the primary colors: the three black-and-white films are called color separations and each represents the proportion of red, green, or blue light making up the original color image. If the matting screen is blue, the conventional choice in modern motion-picture production, then the matte will be made by putting the negative red separation (a black-and-gray partial silhouette of the object on clear film) against the positive blue separation (also a black-and-gray silhouette on clear film) and making a density matte from them. The blue screen is required by the need to use the positive blue separation, its partial silhouette of the object an approximate complement of the silhouette on the negative red separation, to fill in those areas of the negative red separation that would otherwise be too transparent to make a proper density matte.

Largely because of the need to reprint the matte through several generations of black-and-white film, the conventional making of indirect mattes is slow and expensive and the creation of high-quality mattes is extremely difficult. Further, the conventional methods impose lighting and background restrictions that are not always consistent with the moviemaker's needs. Therefore, I created the present invention to give moviemakers a wider range of possibilities for generation of high-quality mattes with less effort and expense than the prior art allows.

SUMMARY OF THE INVENTION

According to the present invention a method of making an optical matte of an object consists of photographing onto a suitable stock of black-and-white film the image of a luminous silhouette of the object on a black background, which image is created by causing the light making up the image of the object and a nonblack background to undergo destructive interference with light making up the image of the background alone. The method is carried out in a laser-illuminated Mach-Zehnder interferometer that has been modified to include phase shifters for each wavelength of light used, two film gates, and the Fourier-optical systems needed to create the requisite images from diffracted plane waves of light. Light from lasers is to be used because only narrowband monochromatic light can be made to satisfy the interference criterion with a simple phase shifter. The use of light in the form of plane waves, requiring the use of Fourier-transform optics, is not essential to the method, but loosens the restrictions on calibration of the interferometer relative to what they would be if the light were propagating in spherical waves.

THE PREFERRED EMBODIMENTS

I will now describe the preferred embodiments of my invention in appropriate detail with reference to the accompanying drawing, in which:

FIG. 1 is a diagrammatic plan view of an apparatus suitable for carrying out the method of the invention by way of the image interference process.

In the embodiment of FIG. 1 an optical-matte generator comprises: three lasers 1, 2, and 3, projecting plane waves of coherent light onto a beam splitter 4; three phase shifters 5, 6, and 7, so positioned that each intercepts only one of the rays emanating from the lasers 1, 2, and 3; a mirror 8 and two beam splitters 9 and 10, so positioned that each intercepts only one of the rays emanating from the lasers 1, 2, and 3 and reflects it onto a film gate 11; a mirror 12 and two beam splitters 13 and 14, so positioned that each intercepts only one of the rays emanating from the lasers 1, 2, and 3 by reflection from the beam splitter 4 and reflects it onto a film gate 15; a Fourier-optical system comprising a lens 16 one focal length from the film gate 11 and a lens 17 one focal length from the Fourier transform plane 18 created by the lens 16; a Fourier-optical system comprising a lens 19 one focal length from the film gate 15 and a lens 20 one focal length from the Fourier transform plane 21 created by the lens 19; a beam splitter 22; a rear-projection screen 23 occupying the Fourier transform plane created by and common to the lenses 17 and 20; a contrast reducer 24; and a film camera 25.

The method of the invention is carried out with the embodiment of FIG. 1 in the following way:

(a) The object of which a matte is to be made is photographed against a background which has no color exactly like the colors visible on the object and then the background is photographed without the object in front of it. Positive or negative prints are made of both the object film and the background film. If the background is a featureless monochromatic screen, it need not be photographed but may be represented by a simple filter of the appropriate color.

(b) If it is the positive prints that are to be used, the positive object print is loaded into one of the film gates 11 and 15 and the positive background print is loaded into the other film gate. Plane waves of coherent light from the lasers 1, 2, and 3 fall upon the two films, are diffracted by the images on the films, and are reconstructed into copies of the images on the films on the rear-projection screen 23 by the two Fourier-optical systems. The alignment of the apparatus is adjusted until the two images on the screen 23 coincide exactly.

(c) The phase shifters 5, 6, and 7 are used to effectively lengthen or shorten one of the optical paths leading from the lasers 1, 2, and 3 to the screen 23, so shifting the phase of the light waves traversing that path that the light making up the background in one of the images on the screen 23 exactly cancels the light making up the background in the other image on the screen 23 through destructive interference. Three separate phase shifters are needed because the lasers 1, 2, and 3 emit three different wavelengths of light, corresponding to the primary colors of photography, and each of the rays of light emanating from the lasers requires a different change in its optical path length to effect the desired phase shift. The phase shifters 5, 6, and 7 may be eliminated from the apparatus if the necessary phase shifts are effected by movement of the mirror 8 and the beam splitters 9 and 10 or by movement of the mirror 12 and the beam splitters 13 and 14. The result, in either case, is a luminous silhouette of the object on an otherwise dark background visible on the screen 23. And (d) The luminosity contrasts within the luminous silhouette visible on the screen 23 are reduced by the contrast reducer 24 and the resulting contrast-reduced silhouette is photographed onto a suitable stock of black-and-white film by the camera 25.

In an alternative method of using the embodiment of FIG. 1 a positive object print is loaded into one of the film gates, a negative background print is loaded into the other film gate, and the two images coinciding on the screen 23 are made to interfere as described above. The result is a dark silhouette of the object on a uniformly luminous background. The contrast reducer is removed from the apparatus and the image visible on the screen 23 is photographed onto high-contrast black-and-white film by the camera 25. Contrast reduction within the luminous background is unnecessary.

I claim:

1. A method of making optical mattes, which method comprises photographing onto a suitable stock of film a luminous silhouette of an object on a dark background, the said luminous silhouette of the object on a dark background being created by optically uniting, as in a beam splitter, a positive image of the object and its nonblack background and a positive image of the background alone or a negative image of the object and its nonblack background and a negative image of the background alone and causing the light waves making up one of the images to interfere destructively with the light waves making up the other image.

2. A method of making optical mattes, which method comprises photographing onto a suitable stock of film a dark silhouette of an object on a uniformly luminous background, the said dark silhouette of the object on a uniformly luminous background being created by optically uniting, as in a beam splitter, a positive image of the object and its nonblack background and a negative image of the background alone or a negative image of the object and its nonblack background and a positive image of the background alone and causing the light waves making up one of the images to interfere destructively with the light waves making up the other image.

* * * * *